United States Patent [19]
Lantos

[11] Patent Number: 5,391,304
[45] Date of Patent: Feb. 21, 1995

[54] METHOD FOR DECREASING THE LEVEL OF CONTAMINATION OF FUELS SUCH AS RESIDUAL FUELS AND OTHER LIQUID FUELS CONTAINING RESIDUAL HYDROCARBONS USED FOR DIESEL ENGINES AND GAS TURBINES

[76] Inventor: Federico E. Lantos, Aristobulo del Valle 971, Vicente Lopez, 1638 Pcia, Buenos Aires, Argentina

[21] Appl. No.: 939,151

[22] Filed: Sep. 2, 1992

[51] Int. Cl.$^6$ ................................. B01D 5/00
[52] U.S. Cl. .................... 210/774; 210/787; 210/804; 210/808
[58] Field of Search ............... 210/787, 774, 804, 175, 210/808; 208/179, 184, 186, 187

[56] References Cited
U.S. PATENT DOCUMENTS

| | | | |
|---|---|---|---|
| 1,830,925 | 11/1931 | Brewster et al. | |
| 3,625,881 | 12/1971 | Chambers | 208/184 |
| 3,798,153 | 3/1974 | Arundt, Jr. et al. | |
| 3,923,644 | 12/1975 | Hindman | 208/186 |

*Primary Examiner*—Robert A. Dawson
*Assistant Examiner*—David Reifsnyder
*Attorney, Agent, or Firm*—Sughrue, Mion, Zinn, Macpeak & Seas

[57] ABSTRACT

A method for purifying a hydrocarbon fluid comprising residual hydrocarbons or a blend of residual hydrocarbons with distilled hydrocarbons, to be used as fuel for a diesel engine or a gas turbine, the hydrocarbon fluid containing contaminants colloidally dispersed as stable micelles, the method comprising the following steps, in sequence: (a) disrupting colloidal structure of the micelles by heating the hydrocarbon fluid under pressure to a temperature of at least 110° C. and, in a continuous operation, injecting the heated, pressurized hydrocarbon fluid into a flash chamber with cooled walls maintained at a pressure below the pressure of the hydrocarbon fluid and collecting an oily phase product at the bottom of the flash chamber, the pressure differential between the pressurized hydrocarbon fluid and the flash chamber being at least five bar, (b) recovering co-distilled volatile product fractions by condensation on the cooled flash chamber walls, and (c) separating solids from the collected oily phase product by centrifuging in the clarifying mode or filtration through at least one pore filter.

5 Claims, 3 Drawing Sheets

FIG. 5
Section V-V

FIG. 4

METHOD FOR DECREASING THE LEVEL OF CONTAMINATION OF FUELS SUCH AS RESIDUAL FUELS AND OTHER LIQUID FUELS CONTAINING RESIDUAL HYDROCARBONS USED FOR DIESEL ENGINES AND GAS TURBINES

The present invention refers to a procedure for decreasing the level of contamination of fuels such as residual fuels and other liquid fuels containing residual hydrocarbon used in diesel engines and gas turbines. It also applies to other functional fluids prone to contamination with water and eventually with solids.

It further comprises an EVAPORATOR—CONDENSER for achieving the above purpose.

More specifically the invention relates to novel techniques for improving conventional methods for reducing the level of contamination of residual fuel used in diesel engines, viz.: heavy fuel oil (residual hydrocarbons) and/or blends of heavy fuel oil with distillates meeting specifications according to Classification ISO 8217(87):F - RM 10 to RM H55 equivalent to British Standard BS MA 100: Class M 4 to M 12, also commercially known as IFO 30 to IFO 700 or IF 30 to IF 700, and also crudes.

The invention also relates to a technique for purifying other functional fluids prone to contamination with water and eventually with solids, above contaminants giving rise to emulsions or dispersions with at least part of the contaminating water, said emulsions interfering with the specific functions of the fluid, causing operational inconveniences, corrosion, wear, clogging of filters, reaction of water with the fluid and/or eventual additives present, with detriment to above mentioned specific functions.

The matter involved in the method of the invention is defined as follows:

Fuel oil—as produced by means of diverse refinery processes and delivered to the end user: a complex system of asphaltenic micelles colloidally dispersed in a continuous phase known as "maltenes".

Functional fluids which might profit by the proposed method: hydraulic oils, lubricants for precision mechanisms having low clearance between moving surfaces, lubricants for cold storage and air conditioning systems, heat transfer oils and others.

Functional fluids, when contaminated with water may evidence a complex colloidal structure similar to that of the fuel oil micelles.

Purifying, as defined in the present invention, means removing the discontinuous phase from the continuous phase.

As will be shown, micelles are responsible for the lack of efficiency of conventional purifying methods of fuels and—as might be the case—of above mentioned functional fluids.

BACKGROUND OF THE INVENTION

Flash vaporization is a well known unit process described by literature. It is widely used in a great variety of manufacturing processes, amongst others distillation and refining of mineral oil and its derivatives, petrochemicals, recovery of used crankcase oil, manufacture of powder milk, etc. Many patents make use of above process, amongst others:

U.S. Pat. No. 3,923,664: PROCESS AND APPARATUS FOR RE-REFINING USED PETROLEUM PRODUCTS deals with reclaiming used crankcase oils.

U.S. Pat. No. 3,625,881: CRANK CASE OIL REFINING

U.S. Pat. No. 4,082,653: CRUDE OIL DISTILLATION PROCESS

U.S. Pat. No. 3,888,760: AVOIDING HEAT EXCHANGER FOULING

AFTER CRUDE OIL DESALTING o7 3

U.S. Pat. No. 3,798,153: CRUDE OIL PROCESSING As can be seen, none of above patents deals with conditioning specifically purifying, of fuel or other functional fluids, this being the purpose of the herein proposed method.

In residual fuel, as well as in other functional fluids concerned with the present invention, contaminants are colloidally dispersed, contaminating water acting as stabilizer of the dispersion. Water enhances the formation of micelles.

A micelle consists of a solid or liquid nucleus insoluble in the surrounding continuous liquid phase, the density of above nucleus being—in the case of fuel oil—appreciably higher than that of the continous phase.

Each nucleus is surrounded by an infinite number of concentric adsorbed layers, solubility of which increases systematically in the continuous phase.

Micelles constitute a disperse or discontinuous phase in a continuous medium. The volume of each micelle is appreciably larger than that of its nucleus and its density approaches that of the continuous phase.

Due to the low density differential between the continous maltene phase and the disperse asphaltenic phase consisting of micelles, the latter do not precipitate and separation between the two phases, be it by settling or centrifugation is impaired. A dispersion of that type is defined as stable.

Water enhances the formation of stable dispersions and hence impairs separation of harmful contaminants by settling or centrifuging, even if the density of the solid contaminants is appreciably higher than that of the continuous phase.

On the other hand, due to their gluey or pasty consistency, micelles tend to clog filters, causing premature saturation.

Fuel oil, as received by the end user is always contaminated containing—amongst others—oxides and silicates of aluminum (catalytic fines), sand, rust, iron particles and dispersed carbonaceous matter.

Residual fuels were first used in the 1940's (J. Lamb, The burning of boiler fuel in marine diese engines—Transactions, The Institute of Marine Engineers—Vol. 60 No 1, 1948 Pages 1 to 39). At present virtually all big, slow, high-power diesel engines (up to 64320 bhp and 5590 bhp per cylinder, e.g. MAN-B&W 12 cylinder K90MC and K90MC-C respectively) operate on residual fuel (source of information: Marine Engineers Review Directory of Marine Diesel Engines—1990).

Residual fuels up to 750 cst at 50 C. (above BSMA 100 Class M 12 and ISO F-RMH55) hare being used, even in medium speed propulsion engines e.g. Wartsils Diesel Series Vasa 46 operating at 450 to 514 rpm and auxiliary engines operating up to 1200 rpm. (W. Lowe, The use of heavy fuels in diesel engines of marine auxiliary sizes—Transactions, The Institute of Marine Engineers, Vol. 97 Paper 13, 1985 and H. Sjoeberg, Combustion studies and endurance tests on low ignition quality fuel oil—Transactions, The Institute of Marine Engineers, Vol. 99 Paper 24, 1987.)

On the other hand, due to changes in refinery processes, increasing demand for hydrocarbon distillates, and—since 1973—in the cost of petroleum products, quality and contamination of residual fuel as delivered worldwide tend to become progressively worse from year to year. It should be pointed out that most of the fuel actually marketed contains amongst other components "slurry oil", i.e. a by-product from the catalytic cracking operation with a relatively high percentage of so called "cat fines" i.e. very small particles of highly abrasive aluminum oxides and silicates. For that reason British Standards BSMA 100 sets a limit of 30 ppm maximum for aluminum and ISO 8217 and CIMAC a limit of 80 ppm for aluminum + silicon for marine fuel as purchased.

Exhaustive investigations carried out in the course of the past years have shown a significant rise in wear due to the presence of abrasives in the fuel (E. W. Hutchins, Fuel filtration to prevent engine damage—Shipbuilding Technology International 1990 Sterling Publications Ltd. London 1990). From the very beginning, when diesel motors started operating on residual fuel, serious problems arose due to contaminants in the fuel as fed to the engines. The importance of correct purification was recognized, as well as the operating difficulties involved in attaining correct purification (A. Norling, The burning of boiler fuels in diesel engines—Shipbuilding Section of the Swedish Society for Technology, Oct. 1, 1949 and H.T. Winberg, The purification of heavy fuel oil for diesel engines—The Motor Ship July 1954).

Methods for purifying fuel at present are nevertheless almost identical to those before 1950, viz.: settling, centrifuging and filtration in this order. Improvements since residual hydrocarbon fractions started to be used as diesel fuel consist essentially in automation of centrifuges (Erikson, Practical experiences of ALC: a separation system for heavy fuel oil—Transactions, The Institute of Marine Engineers, Vol. 97, Paper 22, 1985) and in providing improved filters and filtration media (E. W. Hutchins, Fuel filtration to prevent engine damage—Shipbuilding Technology International 1990, Sterling Publications Ltd. London and M. V. Jones, Fuel system design features and operating practices— Transactions, The Institute of Marine Engineers Vol. 96 Paper 58, 1984).

More or less serious operating difficulties, wear, major damage and poor yield of diesel engines are frequently caused by the presence of impurities in the fuel as fed to the engines, due to the lack of efficiency of centrifuges and filters as used at present.

All those familiarized with and responsible for large diesel engines operating with residual fuel (e.g. power plants and/or motor vessels) are well aware, that the efficiency of fuel purification by convential procedures depends on the physical, chemical and physico-chemical characteristics of the fuel, which vary from shipment to shipment as bunkered. Shipments differ amongst others in: density, viscosity, molecular weight of the components and paraffinic/naphthenic/aromatic hydrocarbon ratio and hence in ignition quality, compatibility between components, and thermal and storage stability.

Further variations from shipment to shipment are the concentration of contaminants, always present in fuel as received by the end user and the state of dispersion of above contaminants.

Frequently fuels originating from different sources are mutually incompatible. Mixing those fuels in the same tank gives rise to excessive sludge accumulation in tanks and centrifuge bowls, premature clogging of filters and other inconveniences.

Worldwide methods for overcoming above difficulties are being investigated. MER—Marine Engineers Review, September 1990, page 30 states under the heading: "Combined ultrasonic/filtering concept claims improved fuel cleanliness": A device—Ultrasaff—has been developed by the Finnish company Acomarin Oy, as a response to the need for better filtering, homogenisation and emulsification technology in coping with cat fines, wax, asphaltnes, water, etc—the plaque of efficient diesel engine operation. A device based on identical principles is manufactured and marketed by the Japanese firm "MARISAVE".

IMPROVEMENT OF THE INVENTION

The method of the invention is based on the disruption of colloidal systems (micelles). According to the present invention, disruption of the colloidal system must take place prior to the final step(s) for eliminating solid contaminants i.e. centrifugal clarifying and/or filtering.

It may eventually also be preceded by pre-purification operations, e.g. water washing to eliminate water soluble contaminants such as sodium chloride and centrifuging in the purifying mode, to eliminate "free" i.e. not emulsified water. Said disruption is achieved by means of flash evaporation of the contaminating water.

The invention also comprises an evaporator—condenser device in which the decisive step on which the proposed technique, viz.: disruption of the colloidal structure of the fuel oil or contaminated functional fluid which impairs efficient purification, occurs. The evaporator-condenser is designed so as to automatically recover light hydrocarbon fractions, eventually vaporized simultaneously with water and to reincorporate them into the dehydrated fuel or functional fluid. The method proposed in the present invention does not replace but complements conventional purifying equipment (centrifuges, filters, magnetic plugs, etc.) usually present. It improves the overall purifying efficiency and broadens its range of operating conditions.

Required additional equipment is inserted in existing installations. Hence, retrofitting additional equipment to existing installation normally found in engine rooms can be acomplished at low cost, without interfering with normal operation of engines and/or systems requiring purification of their working fluid.

Depending on the product to be conditioned or purified, destabilization of the colloidal structure may be preceded by and should be followed by additional steps to eliminate undesirable solid impurities if present. Thus, for example, before eliminating colloidally dispersed contaminating water by flash evaporation, fuel oil may be desalted by means of fresh water-washing to decrease sodium chloride to acceptable levels—sodium being highly detrimental—followed by centrifuging in the purifying mode for separating "free" (not emulsified) fresh water. Desalting by water-washing can only be achieved if the relative density of the fuel with respect to water both at about 95° C. to 98 ° is below 0.99.

After disrupting the colloidal system by flash evaporation, the fuel is to be submitted to centrifuging in the clarifying mode and to final filtration. Depending on filter media available, clarifying may be omitted.

Conditioning by the proposed method of other fluids, e.g. hydraulic oils, differs from the procedure used for fuel oil as refers to steps and sequence to be followed.

The present invention differs essentially from conventional methods inasmuch as it introduces the additional step of breaking up of highly stable colloidal systems, achieved by eliminating the contaminating colloidally bound water by means of evaporation prior to further steps of purification. The method proposed in the present invention consists in the disruption of the colloidal system, by means of dehydration of the micelles, prior to centrifuging the fuel in the clarifying mode and/or final filtration.

The proposed method alters the physico-chemical structure of the fluid by eliminating water before substantially separating the remaining solid contaminants, thereby enhancing centrifuging in the clarifying mode and filtering efficiencies.

None of the prior known methods of fuel purification eliminate colloidally bound water by flash evaporation, nor do they disrupt the micelles—i.e. the colloidal structure of the fuel—prior to final purifying steps (centrifuging and filtration), for not having recognized that colloidal structure is the prime cause for the lack of efficiency of classical purification methods. As stated earlier, fuel oil, as received by the end user, is a colloidal dispersion of ASPHALTENES peptised in the continuous oily MALTENE medium.

Maltenes consist essentially of a wide range of molecular weight, mutually soluble hydrocarbons.

Asphaltenes are complex high molecular weight hydrocarbon compounds of very high C/H ratio, containing, in addition, smaller amounts of sulfur, oxygen and nitrogen. In fuel oil they occur in a fairly wide range of molecular weights.

Physically, an asphaltene micelle can be considered as consisting of a very high C/H ratio solid or semisolid carbonaceous nucleus, totally insoluble in the maltene phase and whose density is appreciably higher than that of the latter.

Each nucleus is surrounded by an infinite number of adsorbed hydrocarbon layers gradually decreasing in C/H ratio, molecular weight, viscosity and density from that of the asphaltene nucleus, until the C/H ratio of the outermost adsorbed layer is almost equal to that of the maltene phase. The adsorbed layers are partially soluble in the maltene phase. Their solubility, i.e. their desorption from the micelles depends on their chemical composition and on the chemical composition of the maltene phase. Solubility increases with temperature.

Due to the polar nature of asphaltene nuclei they also adsorb compounds containing sulfur, nitrogen and oxygen stemming from the crude oil as well as traces of water which, in turn, tend to adsorb low size extrinsic solid contaminants. Solid contaminants mostly detected in fuel are: rust, sand and "catalytic fines" (oxides and silicates of aluminum), all of them extremely abrasive.

As harmful contaminants, viz.: water and solids as well as sulfur compounds concentrate in the proximity of asphaltenic nuclei, any purifying system must eliminate the asphaltenic nuclei and compounds adhering to them i.e. the micelles.

The micelles are also responsible for the colloidal properties of fuel oil.

The volume of the asphaltene micelles, as described above is large compared to the volume of its heavier components (high molecular weight, virtually solid nuclei, water and inorganic solids). Hence the volume of each solid, high density nucleus is neglibible as compared to the volume of its micelle and the density of the micelles approaches that of the maltenic phase.

The chemical composition of the maltene phase and of the asphaltenes, and the ratio of asphaltenes to maltenes vary from shipment to shipment of fuel oil, depending on the nature of the crude oil processed as well as on the refining methods used.

Consequently purifying conditions by conventional methods must adjust to the physico-chemical characteristics of each fuel shipment and to its tendency to emulsify with water and/or to retain solid contaminants.

Mixing of fuels of different origin and/or of residual hydrocarbons with distillates frequently gives rise to flocculation of part of the micelles. This phenomenon is known as "lack of stability" or "incompatibility of components". Amongst others, incompatiblity may cause: stratification in storage tanks, non-homogeneous fuel as fed to centrifuges and motors, premature accumulation of sludge in centrifuge bowls, premature clogging of filters and lack of efficiency of available purifying equipment.

Incompatibility and instability can be determined by means of ASTM Method D 2781. Above test, carried out before or during bunkering, warns the personnel in charge of the engines against eventual future operating difficulties.

Conventional purifying techniques involve the following steps:

1- Settling: partial removal of "free" (not emulsified) water, water soluble contaminants (essentially sodium chloride) and solids not adsorbed by micelles.

2- Centrifuging in the purifying mode: elimination of remnant "free" not emulsified water, partial elimination of water soluble salts, essentially sodium chloride and partial elimination of asphaltene micelles, including solid contaminants.

3- Centrifuging in the clarifying mode: partial removal of heavy asphaltene micelles, including some emulsified water and adsorbed solid contaminants.

4- Filtration: tending to eliminate remnant abrasive solid impurities, mostly colloidally dispersed in micelles not pre viuously separated.

Flash dehydrating prior to Step 3—as specified in the present invention—influences efficiency of clarifying and of filtration, for the following reasons:

Settling rate—according to Stokes' law—is directly proportional to density differential between the disperse and the continuous phase and inversely proportional to viscosity.

Purifying efficiency of the centrifuge in the clarifying mode is directly proportional to settling rate and to residence time in the centrifuge bowl, the latter being necessarily limited by operational requirements. Settling rate is thus the factor determing clarifying efficiency. In other words, efficiency of separation by centrifuging in the clarifying mode depends exclusively on the density differential between the discontinous (asphaltenic) and continous (maltenic) phase and on the viscosity of the fluid to be purified For reasons stated earlier density differentials between the asphaltene and maltene phases are usually low.

For attaining optimum efficiency, conventionally fuel temperature is raised to about 98 C. resulting in:
- decrease of the density of the maltene phase
- solubilization of the external layers of the micelles

- slight decrease in volume and hence increase in density of the micelles
- decrease in viscosity As centrifuges operate at atmospheric pressure and water is never completely eliminated prior to clarification centrifuging at higher temperature gives rise to boiling, foaming and turbulence within the centrifuge bowl, interfering with centrifugal separation.

A further limitation to correct centrifugal purification is the maximum admissible density of the fuel as received, at present 0,991 kg/l @ 15 C. according to British Standard BSMA 100 (1,010 kg/l is admitted by a number of fuels according to ISO 8217 (87) and CIMAC).

Statistics by "Veritas Petroleum Services" have shown a worldwide trend to increase densities. Nine out of 32 samples of fuel oil (G35) bunkered at different ports had densities at 15 C. between 0.992 and 1.008 kg/l. Several samples had up to 12.2% water and up to 0.30% ash content (MER Marine Engineers Review—September 1990 page 32).

A relatively new type of centrifuge (Alfa-Laval AL-CAP) admits density limits up to 1,013 kg/l at 15 C. (Erikson, Practical experiences of ALCAP: a separation system for heavy fuel oil—Transactions—The Institute of Marine Engineers, Vol. 97 Paper 22 1985). But, like the rest of centrifuges, ALCAP is unable to completely eliminate emuslified water. High density fuels usually have high emusified water content.

Conditions being what they are, most engine manufacturers admit 0,2% water maximum as fed to engines due to difficulties—with some fuels—to reach lower levels of contamination with conventional purifying equipment. Experience has nevertheless shown, that even those levels may be harmful.

Numerous analysis of fuel carried out in the course of several years have proven that not all micelles are being eliminatied by conventional centrifuging. Remnant micelles in centrifuged fuel are of gluey consistency. They tend to clog filters and are thus responsible for premature saturation of filters in the final fuel conditioning stage, i.e. after final centrifugation and before being fed to engines.

In order to prevent or retard saturation, the filters used to remove solid impurities are usually 30 to 40 micrometer (nominal) metal sieves. Most solid contaminants harmful to the engines are of appreciably smaller size. Usefulness of above filters in preventing wear is thus debatable.

Frequently premature saturation of filters obliges operators to use filters of even larger pore size with detriment to injection pumps, injectors, piston ring and liners, suffering appreciable abrasive and erosive wear after only few hours of operation.

Analytical results of fuel samples, conventionally conditioned and fed to engines have shown that only rarely a satisfactory elimination af all contaminants was achieved. VPS (Veritas Petroleum Services), a subsiduary of Det Norske Veritas, dedicated exclusively to fuel analysis and consulting on fuel storage, handling and on conditioning based on a service designed "Fuel System Check" state: "VPS knows that fuels, despite going through the treatment systems, have caused engines to suffer failure in one form or another, sometimes with drastic consequences.("How good is the fuel at the engine?"—MER—Marine Engineers Review , November 1990, page 32).

The proposed invention overcomes all above difficulties and limitations, intercalating between purifier and clarifier the flash device previously described, thus disrupting the colloidal structure of fuel by flashing off all free and emusified water.

Basically, the procedure of the present invention comprises the following unit operations:
- Heating under pressure above 100 C.
- Dehydration by flash evaporation
- Recovery of volatile fractions co-distilled with water
- Removal of solids by centrifugation in the clarifying mode at e.g. 120 C. to 180 C.
- Filtration through low pore size (e.g. 5 to 10 micrometer) filters.

From the operational point of view it differs from conventional methods by the fact of introducing an additional step, prior to centrifuging in the clarifying mode and/or filtration viz.: eliminating water by means of flash evaporation.

The proposed innovations influence the purification process as follows:

1.- Prior to dehydration the fuel can be submitted to desalting by means of fresh-water washing. This step requires the relative density of the fuel with respect to water—both at about 98 C.—not to be above 0.99. Water washing leads to stable emulsions. Disruption of above emulsions by conventional purifying methods is cumbersome.

It is therefore omitted whenever possible. Instead, with the method of the invention, the emulsificatin is not harmful, as all water is removed.

Sensors for sodium chloride concentration may be adapted in order to optimize fuel/water ratio.

2.- By the method of the present invention final centrifugation in the clarifying mode (after dehydration) can be carried out at temperatures above 100 C., leading to lower viscosity of the dehydrated fuel—due to higher temperatures—which enhances settling rate of the free floating not colloidally dispersed solid contaminants. Thus, typical viscosity of IF 380 (ISO G35)—one of the most used fuels—is 33 to 40 cst at 100 C. and 14 cst at 150 C. According to Stokes' law,—due to reduced viscosity and all other characteristics (e. g. density differentials) remaining constant, settling rate within the centrifuge at 150 C. is 2.5 to 2.8 times faster as compared to 100 C., In case only one centrifuge is available—danger of carry-over of water having been eliminated—it can be operated in the clarifying mode, hence with better efficiency.

3.- After flash evaporation solid contaminants are no longer colloidally suspended. The density of these solid contaminants is thus equal to that of the nuclei of the original micelles of the fuel as received, this density being appreciably higher than the density of micelles. Higher density differential between solid contaminants and the continuous, liquid phase enhances centrifugal separation.

4.- Upon disruption of the micelles, part of the adsorbed outer layers dissolve in the maltene phase. Above solubilized hydrocarbons, lost in conventional methods, are now incorporated into the fuel and thus increase yield.

5.- Densities of fuels above those actually specified cease to be an obstacle for efficient centrifugal purification. This fact appreciably influences the cost of fuel, representing up to 70% of the operating cost in boats.

6.- The proposed method enables the use of low pore size filters (tentatively 5 to 10 micrometers as compared to 30 to 40 micrometers used with conventionally purified fuel) without risking premature clogging. Filtering, after centrifuging in the clarifying mode eliminates solid contaminants not previously separated due to their small size. Above contaminants deposit on the filter media forming a relatively dry cake. Their tendency to clog filters is appreciably lower than that of the gluey or pasty residue deposited on filters during conventional purifying procedures.

7.- Low size solid contaminants consist essentially of catalytic fines, rust and silica crystals (sand and dust). They are hard and highly abrasive. When fed to diesel engines together with the fuel they are the cause of severe wear and plastic deformation of injection pumps, nozzles, piston rings and liners. Their separation, additionally to avoiding wear, increases combustion efficiency and overall yield and decreases pollution.

8.- Maintenance labour of centrifuges and filters is reduced.

9.- Volume of sludge from centrifuges and filter to be disposed of appreciably decreases.

10.- Engine and purifying equipment manufacturers typically specify:
Maximum use of installed centrifuge capacity at minimum throughput
Avoidance of turbulence of fuel as fed to centrifuge(s)
Stringent temperature control
Choice of correct gravity disk
Constant flow rate Above precautions are not mandatory for the proposed technique.

As stated earlier, elimination of sodium chloride e.g. through contamination with sea water from fuels by centrifuging in the purifying mode is not very efficient.

Excess sodium, specially in the presence of vanadium stemming from the crude oil is highly harmful. M.A.N., one of the most important manufacturers of marine diesel engines specifies (D36 5692 Sp): Sodium 50 ppm to 75 ppm maximum (depending on model) Sodium/vanadium ratio: 0.23 maximum. If above specifications are not met, corrosive, low melting ashes deposit on valve seats exhaust manifolds and turbo-blower blades causing corrosion, imbalance of turbo-blowers and other inconveniences.

All those familiarized with diesels operating on residual fuel are well aware of above inconveniences.

For fuels with relative density with respect to water—both at about 95 C. to 98 C.—below 0.99 the following steps prior to dehydration are advisable:
a) Heating the fluid to be processed to aproximately 90 C. or above e.g. 95 C. to 98 C.
b) Fresh-water desalting by means of commercially available mixers, (e. g. Sulzer Model SMV)
c) Centrifuging in the purifying mode to separate not emulsified water.

The invention also proposes an evaporator-condenser apparatus, in which the above novel purification method may be carried out. This apparatus comprises a substantially cone shaped flash chamber, having in its upper portion at least one nozzle or pressure valve connected to a pump and means of connecting said evaporator-condenser to a pressure regulator, also having in its interior a plurality of baffles adequately distributed and at least one ring shaped collector pan bisected by the conical chamber wall, for collection of water and condensed volatile hydrocarbons, said conical chamber wall defining in said ring shaped collector pan two compartments connected together by apertures and a main collector pan at the bottom of said evaporator-condenser.

DESCRIPTION OF A PREFERRED EMBODIMENT OF THE INVENTION

Figure 1:
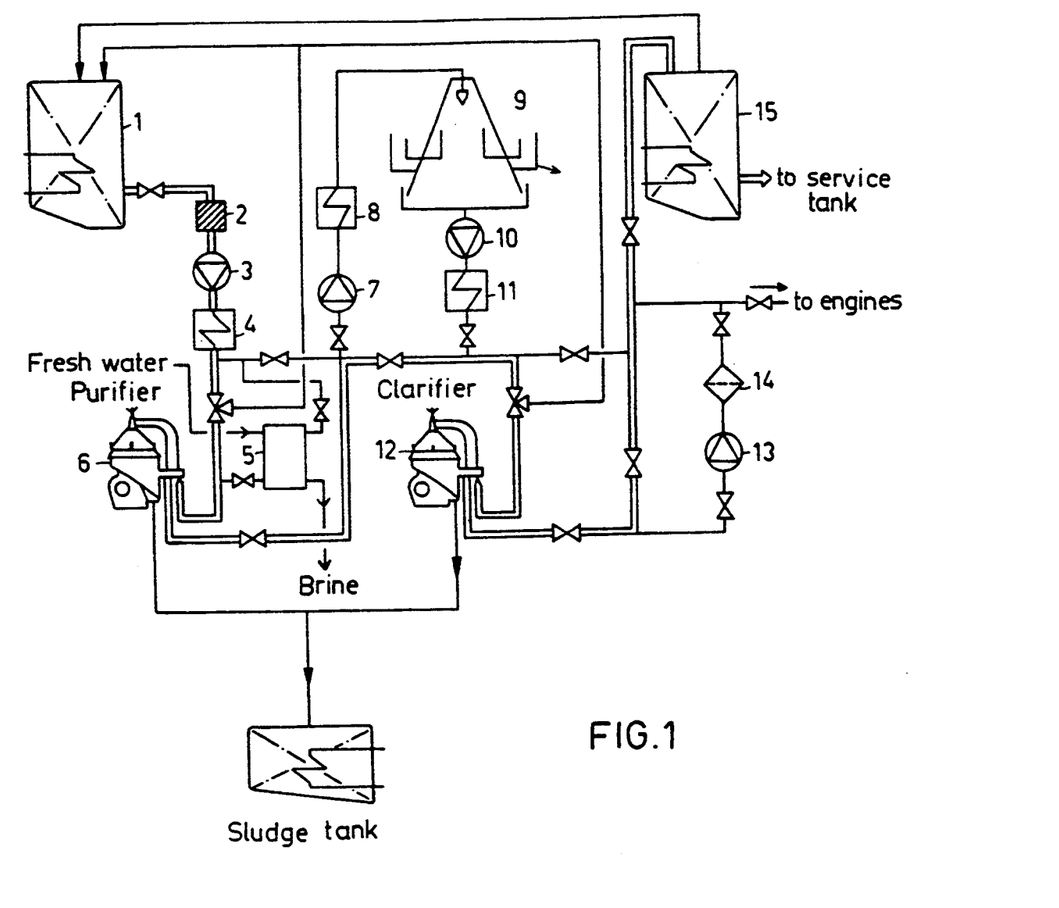
FIG. 1 is a schematic view of the apparatus for purification of fuel oil of the present invention.

Referring particularly to the drawing FIG. 1, fuel from settling tank 1 is pumped by means of pump 3 provided with strainer 2 through heater(s) 4, and eventually desalter 5 to centrifuge 6 operating in the purifying mode.

Figure 2:
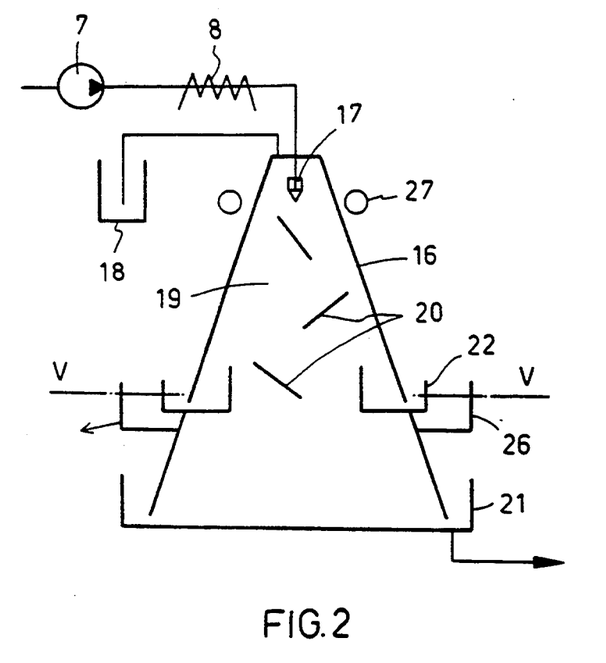
FIG. 2 schematically shows the evaporator-condenser of the apperatus of FIG. 1.

From there the fuel oil is pumped by means of pump 7 at a pressure of about 5 bar to 15 bar to heater(s) 8, temperature being raised to about 110 C. to 180 C. and sprayed by means of one or several nozzles or pressure-drop valves 17 into the upper portion of the evaporator-condenser 9 detailedly shown in FIG. 2.

In accordance with a preferred embodiment of the present invention the evaporator-condensor (FIG. 2) consists of a conical or truncated conical flash chamber 19 surrounded by metal walls 16, the base being open to atmosphere. Pressure within the flash chamber 19 is maintained constant by means of pressure regulator 18 in the upper portion in which above mentioned nozzles are located. Baffles 20 inside flash chamber 19 are intended to guide the sprayed fuel flow towards the main collector pan 21.

Figure 3:
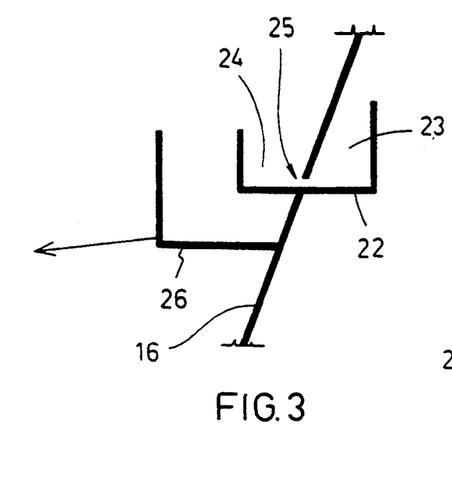
FIG. 3 is a detailed view of the condensate collector ring and water drain pan of the evaporator-condensor of FIG. 2.
Figure 5:
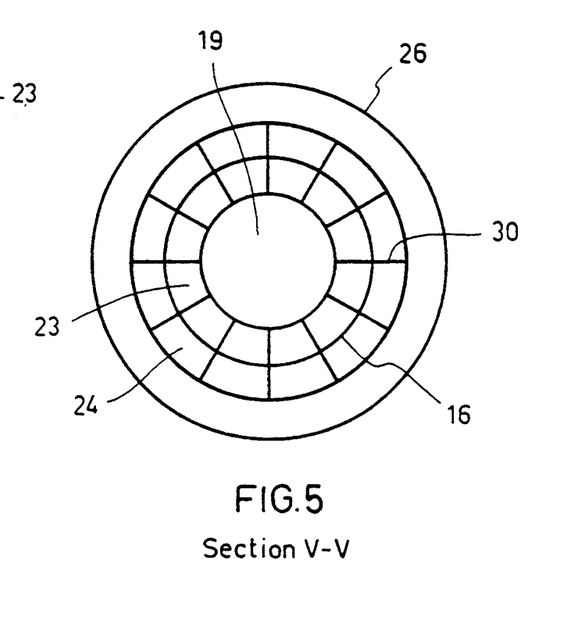
FIG. 5 is a top view of the evaporator-condenser shown in FIG. 2, in particular with modified pans.

The apparatus also is provided with one or more condensate collector pans 22 as shown in FIG. 3 and 5. The collector pans are ring shaped and bisected by the conical chamber wall 16. The collector pans 22 are designed so as to create two compartments: an inner compartment 23 and an outer compartment 24. The two compartments are connected by apertures 25 near their bottoms.

Under the compartment 24 of the lower most collector pan 22, concentrically to the collector pan, a water drain pan 26 is affixed to the outside of chamber wall 16. The outside of chamber wall 16 is cooled by a water spray 27.

For simplicity's sake only the lowest condensate collector pan and the water drain pan are shown on FIGS. 1, 2, 3 and 4.

According to a modification of above embodiment shown in FIG. 5, the collector pans 22 are subdivided radially by means of partition walls 30 so as to prevent horizontal displacement of fluid in case of rolling action in motor vessels.

When installed on board of a Motor vessel, the evaporator-condenser should be mounted on universal joints so as to maintain a vertical position during rolling and pitching of vessel.

OPERATION OF THE APPARATUS

Contaminated fuel, pressurized and heated above the boiling point of water, is injected into the evaporator-condenser the latter being at (or below or slightly above) atmospheric pressure. Emulsified water and light hydrocarbon fractions eventually present flash evaporate and condense on the externally cooled walls of the device, provided with one or several gravity water-hydrocarbon separator tray (s) . Hydrocarbons are recovered and returned to the dehydrated fuel. Condensed water is externally discharged and drained. The dehydrated fuel, containing heavy asphaltenes and inorganic contaminants (catalytic fines, rust, sand, etc. originally adhering to the micelles)—devoid of their colloidal stabilizers (essentially water)—is then submitted to final purification.

Before starting operation, by means of the water spray 27, a water seal is established in each condensate pan 22 covering the apertures which separate the compartments 23 and 24, thus preventing condensed hydrocarbons from escaping from the flash chamber.

As stated the brusque pressure drop through the nozzles or pressure drop valves 17 (typically from above 5 bar to 1 bar) causes atomization of the fuel inside the flash chamber 19. Each droplet consists of a water in oil (W/O) emulsion. i.e. water being the discontinuous phase is surrounded by the continuous oil phase. Temperature of each droplet being above boiling point of water at atmospheric pressure, the water explosively evaporates thereby contributing to further atomization. "Free" not emulsified water, not previously removed as well as light hydrocarbon fractions eventually present in the fuel oil also vaporize. This process causes disruption of the colloidal structure of the fuel oil.

Atomized dehydrated fuel continues straight through or strikes baffles 20 which direct the fuel to the main collecter pan 21 from which it is drawn off by pump 10 for further processing, then heated by means of heater 11 to 110 to 150 C. and fed to centrifuge 12 operating in the clarifying mode and hence eventually pumped through filter 14 of from 5 to 10 micrometer pore size to service tank 25 or directly to the motor.

Steam and any volatilized co-distilled hydrocarbon fractions expand and condense on the externally water-cooled walls 16 of the dehydrator-condenser 9.

The condensate flows down the inner surface of the chamber to wards the inner compartment 23 of the ring shaped condensate collector pans 22.

The condensed hydrocarbons, having a lower density than water, will rise to the top of the liquid in the inner compartment 23 of the condensate collector. Condensed water sinks to the bottom and transfers through apertures 25 to the outer compartment 24. Adjusting overflow levels in both compartments, the water column of the outer compartment 24 counterbalances the water+oil column of the inner compartment 23. As more water and fuel is collected, the inner and outer columns will build up and eventually overflow: condensed hydrocarbons will overflow back into the flash chamber 19 and mix with the heavier fractions. Water will be discharged into a concentric lower collector pan (if present) and finally—from the lowest collector pan—into the water drain pan 26.

Referring again to drawing FIG. 1, desalted and dehydrated fuel oil, as withdrawn from main collector pan 21 by pump 10 is fed to a heater or heat exchanger 11 increasing its temperature typically to 110 C. to 150 C. (depending on the maximum temperature the centrifuge is able to handle) and hence to centrifuge 12 operating in the clarifying mode.

As stated, centrifuging in the clarifying mode may be substituted by coarse filtration followed by low pore filtration.

The dehydrated and clarified fuel is further pumped by means of pump 13 through a filter 14 of pore 5 micrometers to 10 micrometers and finally to the service tank or directly to the motors.

Referring specifically to hydraulic fluids:

It is a well known fact that cleanliness of hydraulic fuels is of prime importance in order to attain optimum yield and to avoid wear, stuck valves and other operational inconveniences.

Contamination of fluids with solids and water is frequently unavoidable. Solid contaminants may originate extrinsically (dust, lints, etc.) and intrinsically (mainly wear particles and rust). Water is an extrinsic contaminant.

Low pore filters are fitted to hydraulic circuits in order to eliminate solid contaminants as they penetrate into or originate within the hydraulic systems.

Experience has shown the presence of water to be undesirable. Even at low concentration water tends to react with additives usually incorporated in hydraulic fluids. Compounds thus formed encourage sludge formation and clogging of filters.

Additive depletion is frequently associated with hydrolysis. Thus water causes the fluid to become less effective as its anti-wear, anti-corrosive and anti-oxidant characteristics are concerned.

For above reasons a series of specifications have emerged amongst others hydrolytic stability (ASTM D 2619) and filterability (TP 02100)—Denison HF-0 which form the basis for the development of a new generation of anti-wear hydraulic fluids (K. B Grover and R. J. Perez—The evolution of petroleum based hydraulic fluids, Lubrication Engineering—Vol 46 (1990) Page 15).

Figure 4:
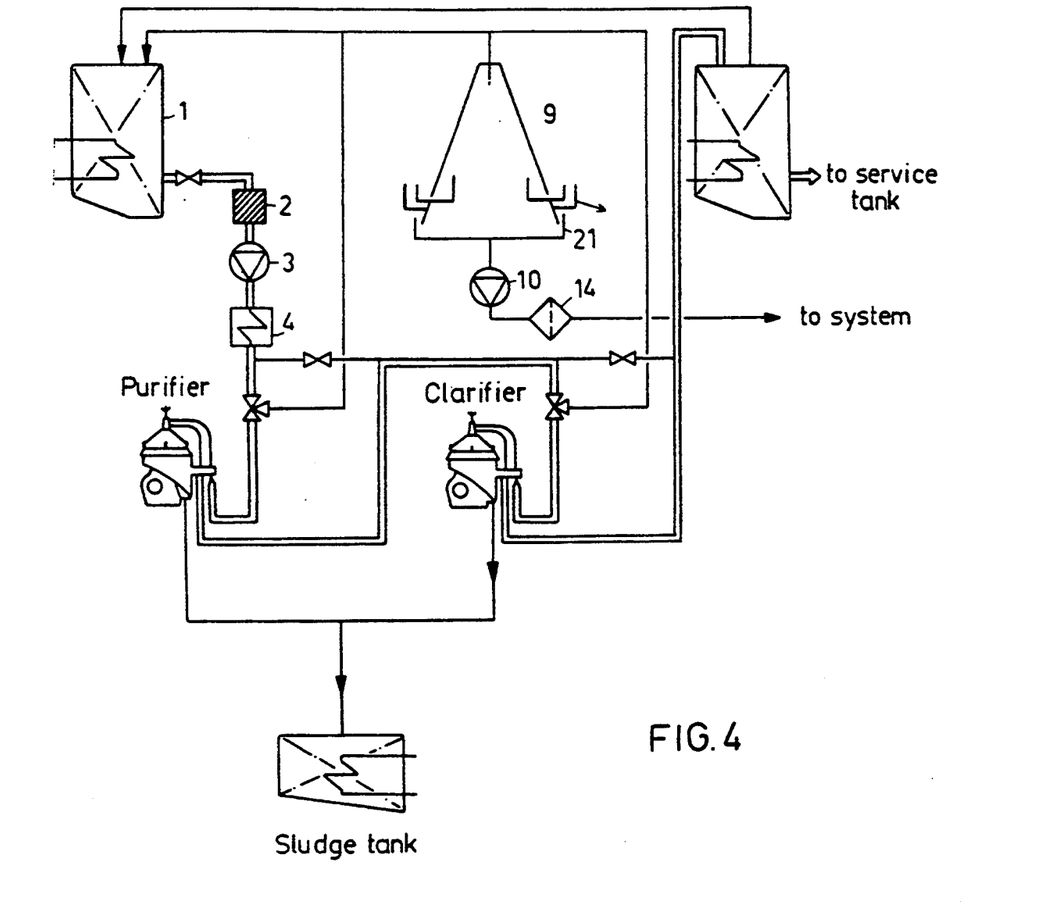
FIG. 4 is a schematic view of the apparaturs as applied to the purification of contaminated hydraulic oil.

Even with fluids complying with said specifications elimination of water as it contaminates the fluid enhances:
useful life of components of the hydraulic systems
efficiency of filters
service life of filter elements
protection of components against corrosion
and reduces:
maintenance labour
lost time due to repairs
additive depletion of the hydraulic fluid Referring specifically to FIG. 4, contaminated hydraulic fluid from sump 1 is pumped by means of pump 3 at a presure of 10 to 15 bar through heater(s) 4, temperature being raised to 110 C. to 130 C. to dehydrator 9, the process of dehydration in 9 being identical to that described for that of fuel oil according to FIGS. 2 and 3.

As described earlier, the brusque pressure drop and temperature above boiling point of water causes atomization of the fluid and flash evaporation of the contaminating water.

Atomized, dehydrated fluid continues straight through or strikes baffles 20 (FIG. 2) to main collector pan 21 from which it is pumped by means of pump 10 through filter 14 to the hydraulic systems. After fulfilling its specific functions it is returned to the sump.

As a further improvement, temperature and pressure of fuel injected into the flash chamber can be reduced. In that case and in order to achieve total evaporation of contaminating water, vacuum must be applied to the flash chamber.

EXAMPLE

Laboratory tests were carried out in order to verify the viability and efficiency of the proposed technique.

For test purposes disruption of the colloidal state can be achieved on a laboratory scale as follows:

In an oven provided with a chimney air is being bubbled through the fuel or functional fluid gradually raising its temperature above 100 C. and keeping it at that temperature until no more vapors are being evolved. Evolving vapors are condensed and collected in a graduated cylinder. Condensed hydrocarbons, separated from condensed water by gravity, are returned to the dehydrated fuel.

Contaminated fuel was heated in a laboratory oven provided with a chimney to from 95 to 98 C. with dry air bubbling through the fuel. After 3 to 4 hours temperature was raised to from 150 C. to 170 C. and mantained at above temperature, always with air bubbling through the fuel for further 5 to 7 hours.

Vapors evolving during said operation and being evacuated through the chimney were condensed on the walls of an air cooled, cone shaped condenser, placed above the chimney. Condensate, consisting of distilled water and light hydrocarbons was collected in a ring shaped collector pan and drained into a graduated cylinder.

Decanted hydrocarbons were added to the dehydrated fuel oil.

After adjusting viscosity to that of the original product, the fuel was heated to 105 C. to 110 C. and vaccuum filtered through a resin treated cellulose membrane of 5 micrometer nominal pore size until saturation of the membrane was achieved. Parameters registered and compared with those of the original product, filtered under identical conditions were: viscosity, water content, volume of fuel filtered to saturation of membrane, filtration time, insolubles retained by the saturated membrane, aspect of filter membrane.

TABLE

|  | Analysis No | | | |
|---|---|---|---|---|
|  | A-154 | A-105 | E 128 | S129 |
|  |  | Fuel type, 3 | | |
|  | IF 380 | IF 180 | IF 80 | IF 80 |
| 1. Sample as received | | | | |
| 1.1 Viscosity at 100 C cst | 34.4 | 20.6 | 13.1 | 9,75 |
| S.U.S. (***) |  |  |  | 58 |
| 1.2 Water % v traces | 1.3 | 2.8 | 0.1 |  |
| 1.3 Volume filtered to saturation of membrane cc | 170 | 180 | 160 | 160 |
| 1.4 Filtration time min. | 20 | 15 | 10 | 10 |
| 1.5 Insolubles retained % m/v | 0.34 | 0.16 | 0.10 | 0.11 |
| 1.6 Aspect of filter membrane | (*) p | p | p | p |
| 2. Dehydrated sample | | | | |
| 2.1 Viscosity at 100° C. cst | 35.3 | 21.0 | 13.8 | 10.3 |
| S.U.S. (***) |  |  |  | 60 |
| 2.2 Water % v | nil | nil | nil | nil |
| 2.3 Volume filtered X to saturation of membrane cc | 400 | 220 | 250 | 300 |
| 2.4 Filtration time min. | 15 | 15 | () | () |
| 2.5 Insolubles retained % m/v | 0.09 | 0.10 | 0.06 | 0.04 |
| 2.5 Aspect of filter n membrane | (*) d | d | d | d |

(*) p: pasty
d: dry
(**) not reported
(***) equivalent to 9.75 cst. and 10.3 cst. respectively

I claim:

1. A method for purifying a hydrocarbon fluid comprising residual hydrocarbons or a blend of residual hydrocarbons with distilled hydrocarbons, to be used as fuel for a diesel engine or a gas turbine, said hydrocarbon fluid containing contaminants colloidally dispersed as stable micelles, said method comprising the following steps, in sequence:
   (a) disrupting colloidal structure of said micelles by heating said hydrocarbon fluid under pressure to a temperature of at least 110° C. and injecting said heated, pressurized hydrocarbon fluid into a flash chamber with cooled walls maintained at a pressure below the pressure of said hydrocarbon fluid and collecting an oily phase product at the bottom of the flash chamber, the pressure differential between the pressurized hydrocarbon fluid and the flash chamber being at least five bar,
   (b) recovering co-distilled volatile product fractions by condensation on the cooled flash chamber walls, and
   (c) separating solids from the collected oily phase product by centrifuging and/or filtration through at least one low pore filter.

2. The method of claim 1, wherein solids are separated from the oily phase product by centrifuging only.

3. The method of claim 1, wherein solids are separated from the oily phase product by filtration only.

4. The method of claim 1, wherein said hydrocarbon fluid has a density in relation to water, at about 98° C., below 0.99 and is subjected to centrifugation prior to said step (a).

5. The method of claim 4, wherein said hydrocarbon fluid is desalted prior to said centrifuging prior to said step (a).

* * * * *

UNITED STATES PATENT AND TRADEMARK OFFICE
CERTIFICATE OF CORRECTION

PATENT NO. : 5,391,304
DATED : February 21, 1995
INVENTOR(S) : Feerico E. lantos It is certified that error appears in the above-indentified patent and that said Letters Patent is hereby corrected as shown below:

In the ABSTRACT, the last line, before "pore", insert --low--.

Column 2, line 1, change "3,923,664" to --3,923,644--.

Column 2, lines 9-11, remove the spacing between the words "FOULING" and "AFTER" so that the title of the referenced U.S. Patent No. 3,888,760 reads as: --AVOIDING HEAT EXCHANGER FOULING AFTER CRUDE OIL DESALTING--.

Column 2, line 11, delete "o73".

Column 2, line 13, after "ING", insert a period --.-- and start a new paragraph.

UNITED STATES PATENT AND TRADEMARK OFFICE
CERTIFICATE OF CORRECTION

PATENT NO. : 5,391,304
DATED : February 21, 1995
INVENTOR(S) : Federico E. Lantos It is certified that error appears in the above-indentified patent and that said Letters Patent is hereby corrected as shown below:

Column 2, line 52, change "diese" to --diesel--.

Column 2, line 62, change "hare being" to --have been--.

Column 2, line 62, change "Wartsils" to --Wartsila--.

Column 3, line 38, change "ALC" to --ALCAP--.

Column 4, line 14, change "plaque" to --plague--.

Column 5, line 25, after "methods", start a new paragraph.

Column 6, line 44, change "pre viuously" to --previously --.

Signed and Sealed this

Twenty-fourth Day of October, 1995

Attest:

BRUCE LEHMAN

*Attesting Officer*   *Commissioner of Patents and Trademarks*